(12) United States Patent
Lee et al.

(10) Patent No.: US 8,570,403 B2
(45) Date of Patent: Oct. 29, 2013

(54) FACE IMAGE REPLACEMENT SYSTEM AND METHOD IMPLEMENTED BY PORTABLE ELECTRONIC DEVICE

(75) Inventors: Hou-Hsien Lee, Tu-Cheng (TW);
Chang-Jung Lee, Tu-Cheng (TW);
Chih-Ping Lo, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 248 days.

(21) Appl. No.: 13/048,899

(22) Filed: Mar. 16, 2011

(65) Prior Publication Data

US 2012/0099002 A1    Apr. 26, 2012

(30) Foreign Application Priority Data

Oct. 20, 2010 (TW) .................................. 99135657

(51) Int. Cl.
*H04N 5/262* (2006.01)
*H04N 5/222* (2006.01)

(52) U.S. Cl.
USPC ................ 348/239; 348/333.02; 348/333.11; 348/333.12

(58) Field of Classification Search
USPC .................. 348/239, 333.01, 333.02, 333.11, 348/333.12; 382/115, 118
See application file for complete search history.

(56) References Cited

U.S. PATENT DOCUMENTS

| | | | | |
|---|---|---|---|---|
| 6,067,399 A * | 5/2000 | Berger | ........................ | 386/280 |
| 6,959,099 B2 * | 10/2005 | Gutta et al. | .................. | 382/100 |
| 7,570,283 B2 * | 8/2009 | Sato et al. | .................. | 348/211.4 |
| 7,912,363 B2 * | 3/2011 | Minato et al. | ................. | 396/123 |
| 8,098,904 B2 * | 1/2012 | Ioffe et al. | ..................... | 382/118 |
| 8,305,448 B2 * | 11/2012 | Yoda | ............................ | 348/152 |
| 2005/0041111 A1 * | 2/2005 | Matsuoka | ............... | 348/207.99 |
| 2005/0105779 A1 * | 5/2005 | Kamei | ......................... | 382/118 |
| 2011/0202968 A1 * | 8/2011 | Nurmi | .............................. | 726/1 |

FOREIGN PATENT DOCUMENTS

CN    101617339 A    12/2009

* cited by examiner

*Primary Examiner* — Daniel M Pasiewicz
(74) *Attorney, Agent, or Firm* — Altis & Wispro Law Group, Inc.

(57) ABSTRACT

A face image replacement system and method is implemented by an portable electronic device. The portable electronic device includes an image capturing device, a display screen, and a storage device. A person image of a user is captured by the image capturing device, and a face area of the person image is determined according to face character data stored in the storage system. The system marks the face area with a rectangle area and calculates a size of the rectangle area, obtains a special image from the storage system, and adjusts a size of the special image according to the size of the rectangle area. The face area of the person image is replaced with the special image to generate a face replacement image, and the face replacement image is displayed on the display screen of the portable electronic device.

9 Claims, 4 Drawing Sheets

FACE IMAGE REPLACEMENT SYSTEM AND METHOD IMPLEMENTED BY PORTABLE ELECTRONIC DEVICE

BACKGROUND

1. Technical Field

Embodiments of the present disclosure relate to image processing systems and methods, and particularly to a face image replacement system and method implemented by a portable electronic device.

2. Description of Related Art

Portable electronic devices, such as personal digital assistants (PDA) or mobile phones, have image capturing functions and image processing functions. For example, a mobile phone can capture an image of a person with an image capturing unit of the mobile phone, and display the image on a display screen of the mobile phone. However, a face image of the image cannot be detected and used to replace the face image with another image, to protect the privacy of the person when the image is viewed by other users.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
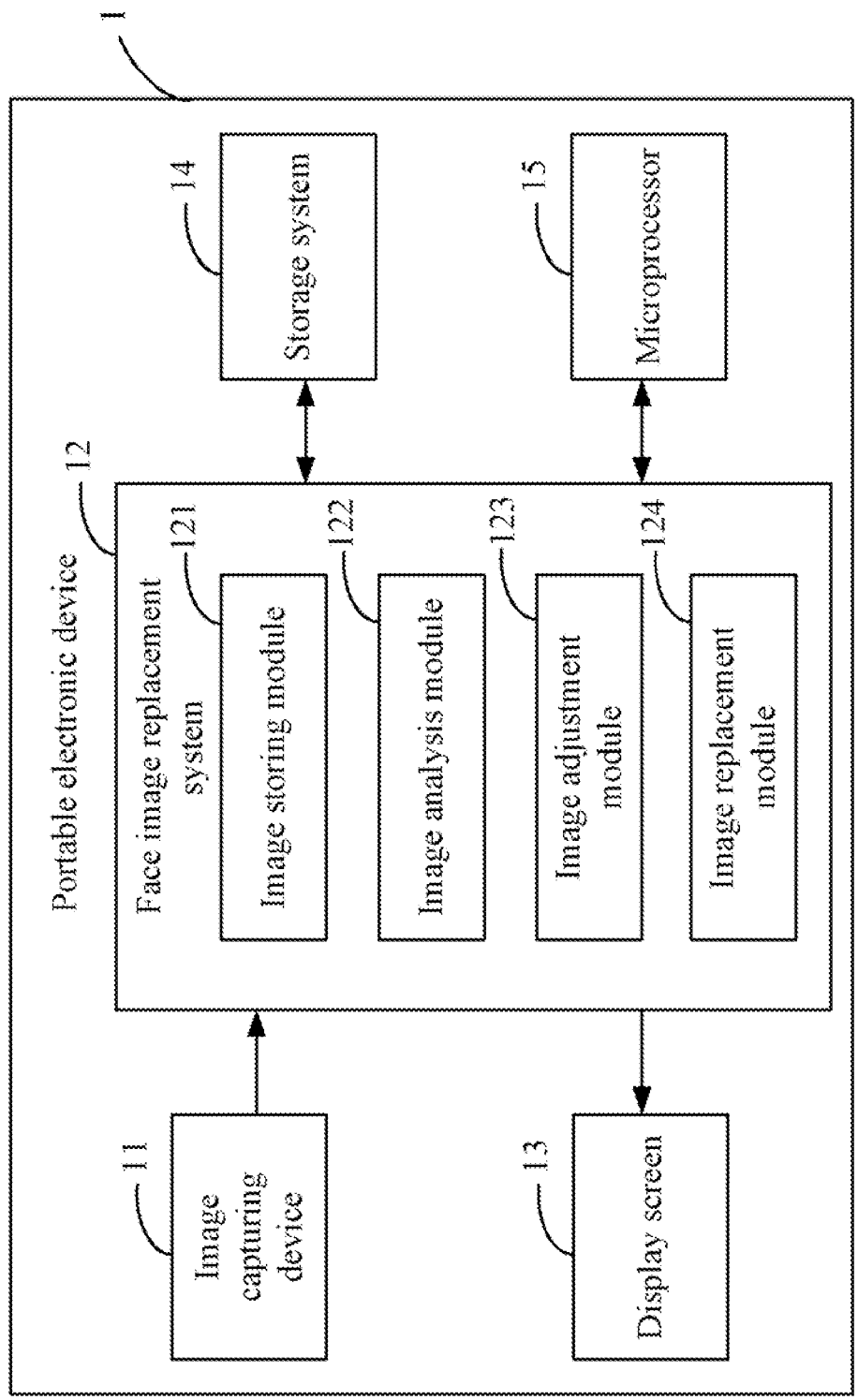
FIG. 1 is a block diagram of one embodiment of a portable electronic device comprising a face image replacement system.

FIG. 1 is a block diagram of one embodiment of a portable electronic device 1 comprising a face image replacement system 12. The face image replacement system 12 can detect a face area in an image of a person, and replace the face area with a special image (e.g., a football image) to cover the face area of the person image, to protect the privacy of the person when the person image is viewed by other users. The portable electronic device 1 further includes an image capturing device 11, a display screen 13, a storage system 14, and a least one microprocessor 15. It should be understood that FIG. 1 illustrates only one example of the portable electronic device 1, and may include more or fewer components than illustrated, or a different configuration of the various components in other embodiments.

Figure 4:
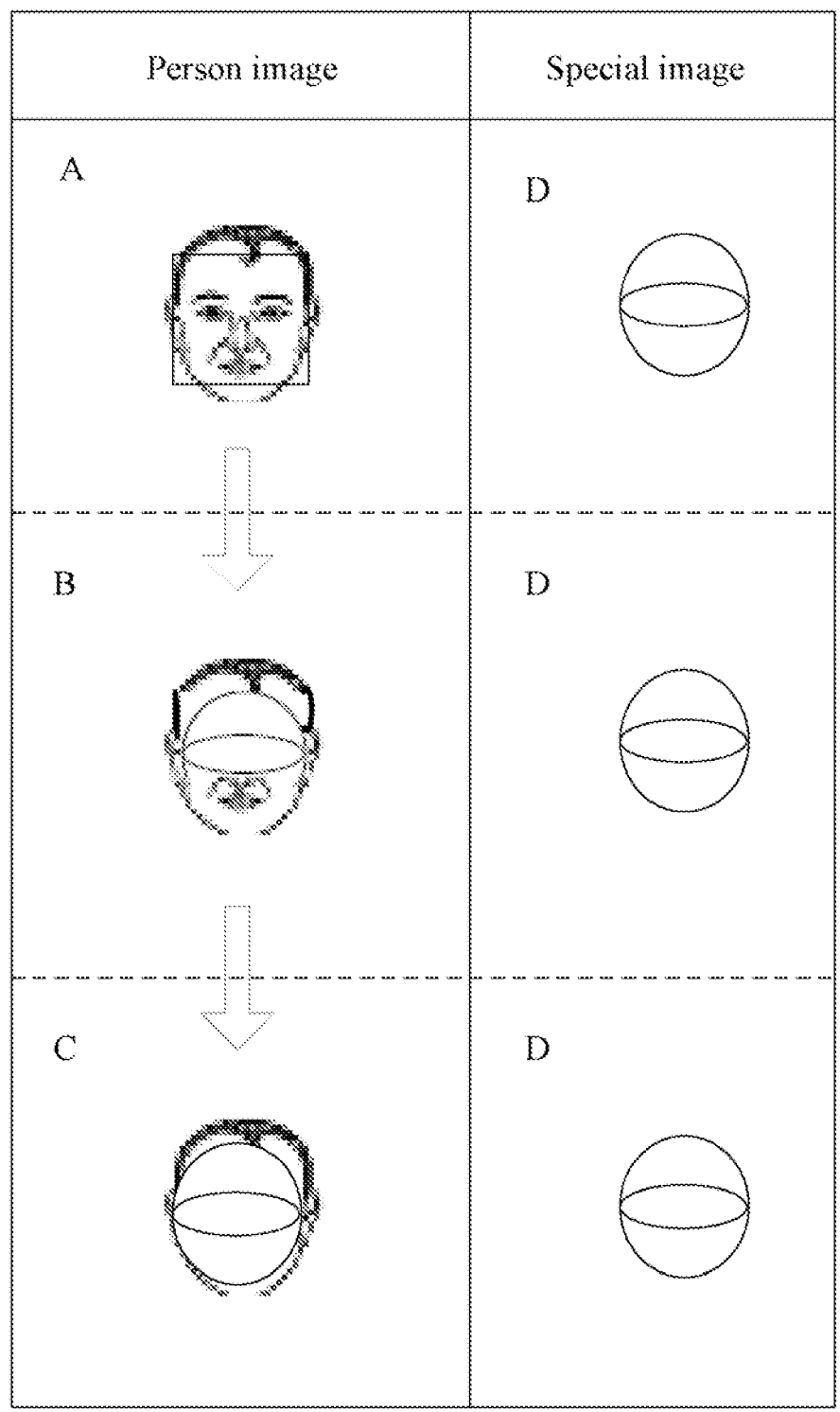
FIG. 4 is a schematic diagram illustrating one example of replacement of a face image captured by the portable electronic device of FIG. 1.

The image capturing device 11 is configured to capture a person image (such as the image "A" as shown in FIG. 4) of a user when the user presses a shutter button of the image capturing device 11. In one embodiment, the image capturing device 11 may be a digital camera or a video capturing device.

The storage system 14 stores one or more special images predefined by the user, such as a football picture "D" as shown in FIG. 4. Each of the special images is used to cover a face area of the image to generate a face replacement image of the user. The storage system 14 may further store different face replacement images that are covered by the special images, such as the face replacement images "B" and "C" as shown in FIG. 4. In one embodiment, the storage system 14 may be an internal storage device, such as a random access memory (RAM) for temporary storage of information, and/or a read only memory (ROM) for permanent storage of information. In some embodiments, the storage system 14 may also be an external storage device, such as an external hard disk, a storage card, or a data storage medium.

In one embodiment, the face image replacement system 12 includes an image storing module 121, an image analysis module 122, an image adjustment module 123, and an image replacement module 124. The modules 121-124 may comprise computerized code in the form of one or more programs that are stored in the storage system 14. The computerized code includes instructions that are executed by the at least one microprocessor 15 to provide functions for implementing the modules. In general, the word "module," as used herein, refers to logic embodied in hardware or firmware, or to a collection of software instructions, written in a program language. In one embodiment, the program language may be Java or C. One or more software instructions in the modules may be embedded in firmware, such as an EPROM. The modules described herein may be implemented as either software and/or hardware modules and may be stored in any type of computer-readable medium or other storage device.

The image storing module 121 is operable to store one or more special images (e.g., a football picture "D" as shown in FIG. 4) to the storage system 14. The image storing module 121 is further operable to store a face replacement image to the storage system 14 when the face area of the image is covered by a special image, such as a face replacement image "C" as shown in FIG. 4.

The image analysis module 122 is operable to control the image capturing device 11 to capture a person image of the user, and analyze pixels of the image to determine a face area of the person image according to face character data stored in the storage system 11. In the embodiment, the face character data may include mouth character data, eye character data, and noise character data.

The image adjustment module 123 is operable to mark the face area with a rectangle area if the image has the face image, and calculate a size of the rectangle area. In one example with respect to FIG. 4, a length of the rectangle area is 3 cm, and a width of the rectangle area is 5 cm. The image adjustment module 123 can use the rectangle area to mark the face area in the image, such as the person image "A" marked with the rectangle area as shown in FIG. 4.

The image adjustment module 123 is further operable to obtain a special image (e.g., a football picture "D" as shown in FIG. 4) from the storage system 14, and adjust a size of the special image according to the size of the rectangle area. In the embodiment, the image adjustment module 123 adjusts a length of the special image as 3 cm, and adjusts a width of the special image as 5 cm.

The image replacement module 124 is operable to replace the face area of the person image with the special image to generate a face replacement image, such as the face replacement image "C" as shown in FIG. 4. The image replacement module 124 is further operable to display the face replacement image on the display screen 13 when the user views the person image.

In one embodiment, the image replacement module 124 checks pixel points of the face image, and determines whether a RGB value of each pixel point of the face area is equal to a gray value. The gray value is defined according to user's requirements, for example, generally defined as R=128, G=128, and B=128. If the RGB value of a pixel point of the face area is equal to the gray value, the image replacement module 124 keeps the pixel point in the face area. Otherwise, the RGB value of a pixel point of the face area is not equal to the gray value, the image replacement module 124 replaces the pixel point of the face area with a pixel point of the special image.

Figure 2:
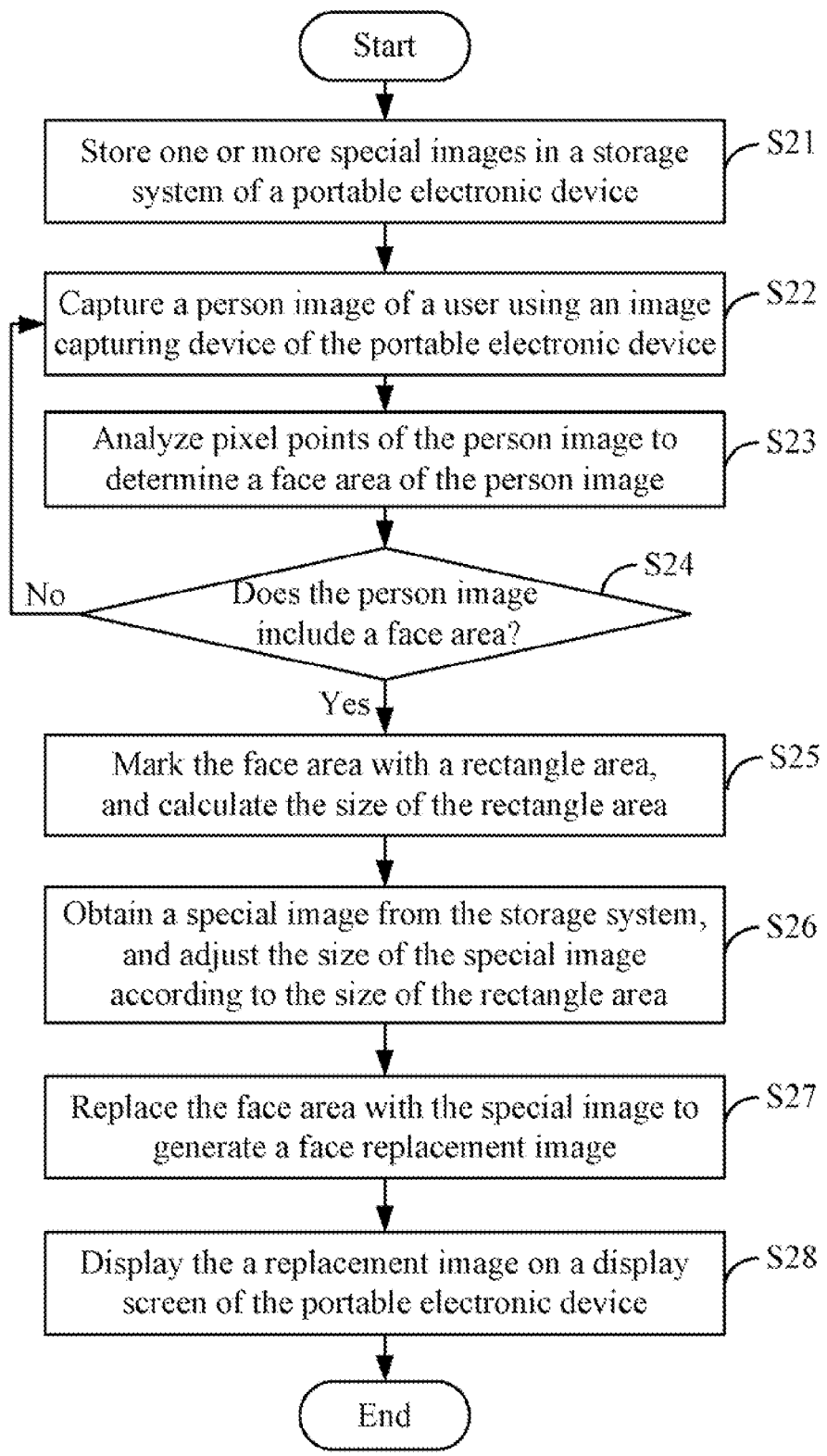
FIG. 2 is a flowchart of one embodiment of a face image replacement method implemented by a portable electronic device of FIG. 1.

FIG. 2 is a flowchart of one embodiment of a face image replacement method implemented by the portable electronic device 1 of FIG. 1. Depending on the embodiment, additional blocks may be added, others removed, and the ordering of the blocks may be changed.

In block S21, the image storing module 121 stores one or more special images (e.g., a football picture "D" as shown in FIG. 4) and face character data to the storage system 14, and stores. In the embodiment, the face character data may include mouth character data, eye character data, and noise character data.

In block S22, the image analysis module 122 controls the image capturing device 11 to obtain a person image of a user. In block S23, the image analysis image module 122 analyzes pixel points of the person image to determine a face area of the person image.

In block S24, the image analysis module 122 determines whether the person image has a face area according to the face character data. If the person image has the face area, block S25 is implemented. Otherwise, if the person image has no face area, block S22 is repeated.

In block S25, the image adjustment module 123 marks the face area with a rectangle area, and calculates a size of the rectangle area. In one example with respect to FIG. 4, a length of the rectangle area is 3 cm, and a width of the rectangle area is 5 cm. The image adjustment module 123 uses the rectangle area to mark the face area in the person image, such as the image "A" marked with the rectangle area as shown in FIG. 4.

In block S26, the image adjustment module 123 obtains a special image (e.g., a football picture "D" as shown in FIG. 4) from the storage system 14, and adjusts a size of the special image according to the size of the rectangle area. In the embodiment, the image adjustment module 123 adjusts a length of the special image as 3 cm, and adjusts a width of the special image as 5 cm.

In block S27, the image replacement module 124 replaces the face area of the person image with the special image to generate a face replacement image, such as the face replacement image "C" as shown in FIG. 4. The face replacement image is generated as described in FIG. 3 below.

In block S28, the image replacement module 124 displays the face replacement image on the display screen 13 when the user views the person image, to protect the privacy of the user when the person image is viewed by other users.

Figure 3:
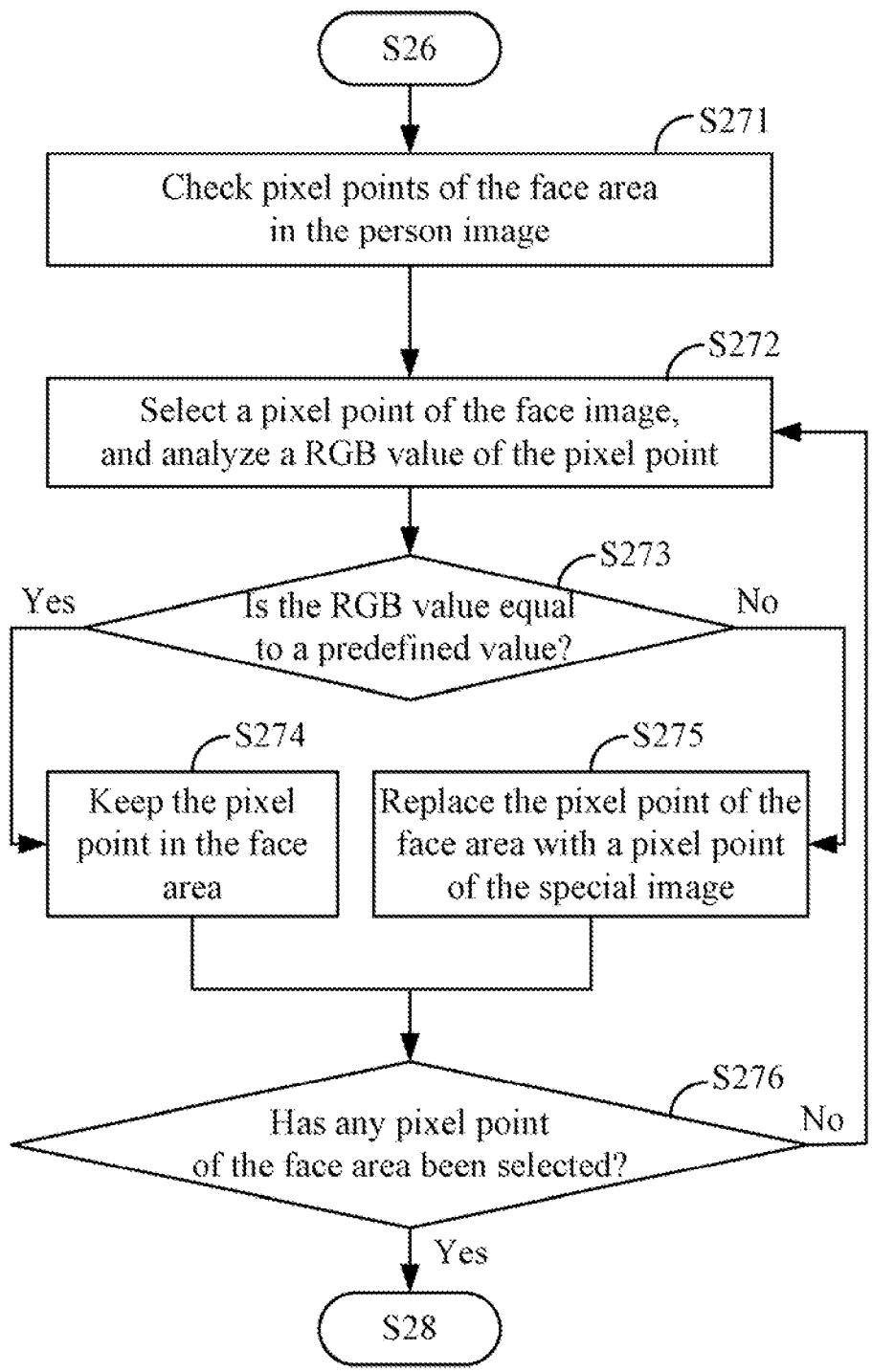
FIG. 3 is a detailed flowchart of block S27 of FIG. 2.

FIG. 3 is a detailed flowchart of block S27 of FIG. 2. In block 5271, the image replacement module 124 checks pixel points of the face area. In block 5272, the image replacement module 124 selects a pixel point of the face area, and analyzes a RGB value of the pixel point.

In block 5273, the image replacement module 124 determines whether the RGB value of the pixel point is equal to a gray value. The gray value is defined according to user's requirements, for example, generally defined as R=128, G=128, and B=128. If the RGB value of the pixel point is equal to the gray value, block 5274 is implemented. Otherwise, the RGB value of the pixel point is equal to a gray value, block 5275 is implemented.

In block S274, the image replacement module 124 keeps the pixel point in the face area of the person image. In block S275, the image replacement module 124 replaces the pixel point of the face area with a pixel point of the special image.

In block S276, the image replacement module 124 determines whether any pixel point of the face area has been selected. If a pixel point of the face area has not been selected, block S272 is repeated. Otherwise, all pixel points of the face area have been selected, the flow goes to block S28 as described in FIG. 2.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A portable electronic device, comprising:
   an image capturing device operable to capture a person image of a user;
   a storage system operable to store one or more special images and face character data;
   a display screen, and at least one microprocessor; and
   one or more programs stored in the storage system and executable by the at least one microprocessor, the one or more programs comprising:
   an image analysis module operable to obtain the person image from the image capturing device, and analyze the person image to determine a face area of the person image according to the face character data stored in the storage system;
   an image adjustment module operable to mark the face area with a rectangle area and calculate a size of the rectangle area, obtain a special image from the storage system, and adjust a size of the special image according to the size of the rectangle area; and
   an image replacement module operable to replace the face area of the person image with the special image to generate a face replacement image, and display the face replacement image on the display screen, wherein the image replacement module further checks pixel points of the face area in the person image, determines whether a RGB (red, green, and blue) value of each pixel point of the face area is equal to a gray value, keeps a pixel point in the face area if the RGB value of the pixel point is equal to the gray value, or replaces the pixel point of the face area with a pixel point of the special image if the RGB value of the pixel point is not equal to the gray value.

2. The portable electronic device according to claim 1, wherein the one or more programs further comprises an image storing module operable to store the one or more special images and the face replacement image to the storage system.

3. The portable electronic device according to claim 1, wherein the face character data comprise mouth character data, eye character data, and noise character data.

4. A face image replacement method implemented by an portable electronic device comprising an image capturing device and a display screen, the method comprising:
   capturing a person image of a user using the image capturing device of the portable electronic device;
   analyzing the person image to determine a face area of the person image according to face character data stored in a storage system of the portable electronic device;
   marking the face area with a rectangle area, and calculating a size of the rectangle area;
   obtaining a special image from the storage system, and adjusting a size of the special image according to the size of the rectangle area;

replacing the face area of the person image with the special image to generate a face replacement image, wherein the replacing step comprises steps of: checking pixel points of the face area in the person image, determining whether a RGB (red, green, and blue) value of each of the pixel points is equal to a gray value, keeping a pixel point in the face area if the RGB value of the pixel point is equal to the gray value, or replacing the pixel point of the face area with a pixel point of the special image if the RGB value of the pixel point is not equal to the gray value; and displaying the face replacement image on the display screen.

5. The method according to claim 4, further comprising:
pre-storing one or more special images and the face character data to the storage system.

6. The method according to claim 4, wherein the face character data comprise mouth character data, eye character data, and noise character data.

7. A non-transitory storage medium having stored thereon instructions that, when executed by at least one microprocessor of an electronic device, causes the electronic device to perform a face image replacement method, the method comprising:

capturing a person image of a user using an image capturing device of the electronic device;

analyzing the person image to determine a face area of the person image according to face character data stored in a storage system of the electronic device;

marking the face area with a rectangle area, and calculating a size of the rectangle area;

obtaining a special image from the storage system, and adjusting a size of the special image according to the size of the rectangle area;

replacing the face area of the person image with the special image to generate a face replacement image, wherein the replacing step comprises steps of: checking pixel points of the face area in the person image, determining whether a RGB (red, green, and blue) value of each of the pixel points is equal to a gray value, keeping a pixel point in the face area if the RGB value of the pixel point is equal to the gray value, or replacing the pixel point of the face area with a pixel point of the special image if the RGB value of the pixel point is not equal to the gray value; and displaying the face replacement image on a display screen of the electronic device.

8. The storage medium according to claim 7, wherein the method further comprises:

pre-storing one or more special images and the face character data to the storage system.

9. The storage medium according to claim 7, wherein the face character data comprise mouth character data, eye character data, and noise character data.

* * * * *